(12) United States Patent
Park et al.

(10) Patent No.: US 8,816,986 B1
(45) Date of Patent: Aug. 26, 2014

(54) MULTIPLE TOUCH DETECTION

(75) Inventors: Seok-Pyong Park, Everett, WA (US); Ryan D. Seguine, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 891 days.

(21) Appl. No.: 12/455,413

(22) Filed: Jun. 1, 2009

Related U.S. Application Data

(63) Continuation-in-part of application No. 12/422,226, filed on Apr. 10, 2009.

(60) Provisional application No. 61/057,864, filed on Jun. 1, 2008.

(51) Int. Cl.
 *G06F 3/045* (2006.01)
 *G06F 3/044* (2006.01)

(52) U.S. Cl.
 CPC .................................. *G06F 3/044* (2013.01)
 USPC .......................................... 345/174; 345/173

(58) Field of Classification Search
 None
 See application file for complete search history.

(56) References Cited

U.S. PATENT DOCUMENTS

| | | | |
|---|---|---|---|
| 4,293,734 A | 10/1981 | Pepper, Jr. | |
| 4,736,191 A | 4/1988 | Matzke et al. | |
| 5,305,017 A | 4/1994 | Gerpheide | |
| 5,543,590 A | 8/1996 | Gillespie et al. | |
| 5,543,591 A | 8/1996 | Gillespie et al. | |
| 5,748,185 A | 5/1998 | Stephan et al. | |
| 5,825,352 A | 10/1998 | Bisset et al. | |
| 5,943,052 A | 8/1999 | Allen et al. | |
| 6,028,271 A | 2/2000 | Gillespie et al. | |
| 6,037,929 A | 3/2000 | Ogura et al. | |
| 6,188,391 B1 | 2/2001 | Seely et al. | |
| 6,262,717 B1 | 7/2001 | Donohue et al. | |
| 6,380,931 B1 | 4/2002 | Gillespie et al. | |
| 6,414,671 B1 | 7/2002 | Gillespie et al. | |
| 6,621,487 B2 * | 9/2003 | Iwasaki et al. | 345/173 |
| 6,704,005 B2 | 3/2004 | Kato et al. | |
| 6,825,890 B2 | 11/2004 | Matsufusa | |
| 7,030,860 B1 | 4/2006 | Hsu et al. | |
| 7,046,230 B2 * | 5/2006 | Zadesky et al. | 345/173 |
| 7,982,717 B2 | 7/2011 | Chien et al. | |
| 8,089,470 B1 * | 1/2012 | Schediwy et al. | 345/173 |
| 8,106,891 B2 * | 1/2012 | Kong et al. | 345/173 |
| 2003/0206162 A1 * | 11/2003 | Roberts | 345/173 |
| 2006/0066582 A1 | 3/2006 | Lyon et al. | |
| 2006/0097991 A1 | 5/2006 | Hotelling et al. | |
| 2008/0150906 A1 | 6/2008 | Grivna | |
| 2009/0128516 A1 * | 5/2009 | Rimon et al. | 345/174 |
| 2009/0167725 A1 | 7/2009 | Lee et al. | |
| 2009/0237362 A1 | 9/2009 | Wu et al. | |

FOREIGN PATENT DOCUMENTS

WO PCT/SE2004/001447 3/2007

OTHER PUBLICATIONS

Ryan Seguine, et al., "Layout Guidelines for PSoC TM CapSense TM"; Cypress Application Note AN2292, Revision B; dated Oct. 2005; 15 pages.

Dennis Seguine; "Captivative Switch Scan"; Cypress Application Note AN2233a, Revision B; dated Apr. 14, 2005; 6 pages.

(Continued)

*Primary Examiner* — Joseph Haley

(57) ABSTRACT

An apparatus for and method of detecting multiple presences on a touch sensor device are described.

19 Claims, 13 Drawing Sheets

(56) References Cited

OTHER PUBLICATIONS

Dave Van Ess; "Understanding Switched Capacitor Analog Blocks"; Cypress Application Note AN2041, Revision B; dated Mar. 30, 2004; 16 pages.
Mark Lee; "CapSense Best Practices"; Cypress Application Note AN2394; dated Oct. 19, 2006; 10 pages.
CSR User Module Data Sheet, CSR v1.0, CY8C21x34 Data Sheet; dated Oct. 6, 2006; 36 pages.
CSD User Module Data Sheet, CSD c1.0; dated Oct. 23, 2006; 58 pages.
Wayne Westerman; "Hand Tracking, Finger Identification, and Chordic Manipulation on a Multi-Touch Surface"; dated Spring 1999; 363 pages.
U.S. Appl. No. 12/422,226 dated Apr. 10, 2009; 40 pages.
U.S. Appl. No. 11/731,893 dated Mar. 29, 2007; 65 pages.
U.S. Appl. No. 12/422,226: "Multiple Touch Detection," Thomas Fuller, filed Apr. 10, 2009; 40 pages.
USPTO Advisory Action for U.S. Appl. No. 12/422,226 dated Mar. 27, 2012; 5 pages.
USPTO Final Rejection for U.S. Appl. No. 12/422,226 dated Jan. 26, 2012; 10 pages.
USPTO Non-Final Rejection for U.S. Appl. No. 12/422,226 dated Oct. 25, 2011; 9 pages.
USPTO Notice of Allowance for U.S. Appl. No. 12/422,226 dated Feb. 28, 2013; 5 pages.
USPTO Notice of Allowance for U.S. Appl. No. 12/422,226 dated Oct. 1, 2012; 7 pages.
USPTO Notice of Allowance for U.S. Appl. No. 12/422,226 dated Nov. 26, 2012; 5 pages.

\* cited by examiner

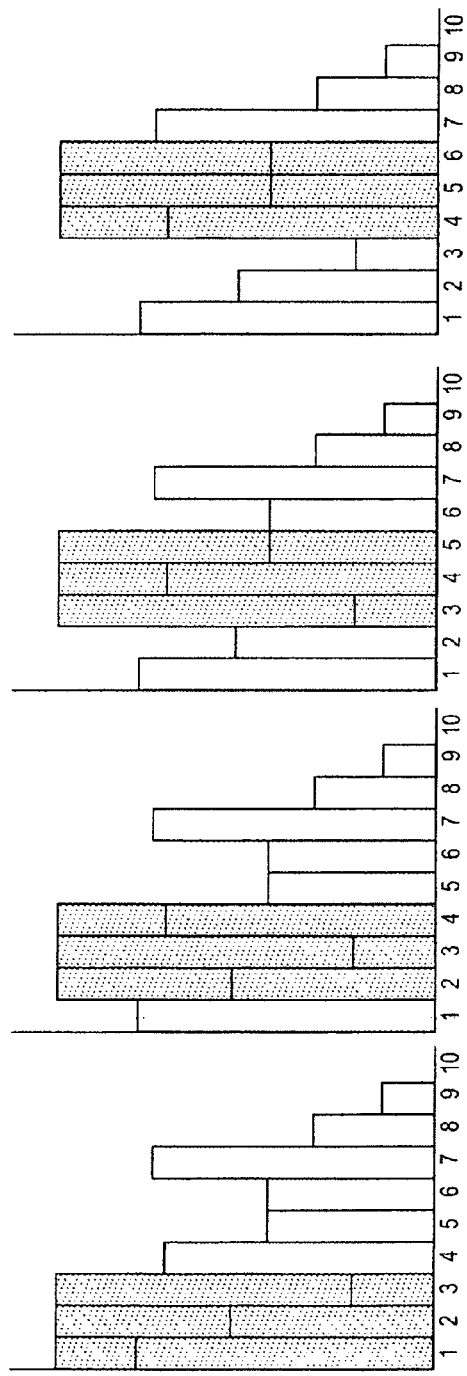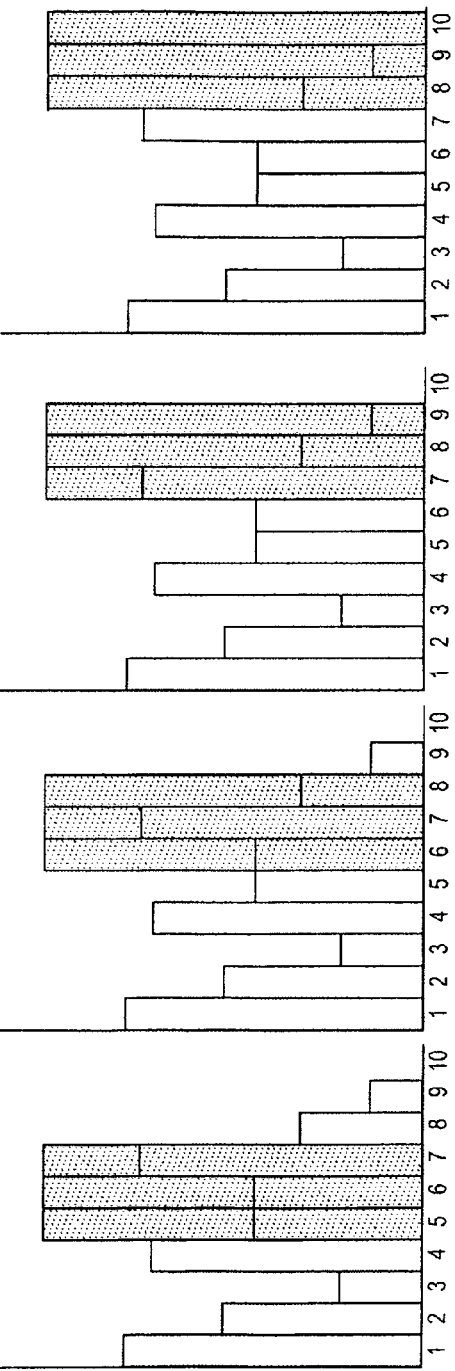

MULTIPLE TOUCH DETECTION

REFERENCE TO RELATED APPLICATION

This application is a continuation-in-part of U.S. application Ser. No. 12/422,226, filed Apr. 10, 2009 which claims the benefit of U.S. Provisional Application No. 61/057,864, filed Jun. 1, 2008.

TECHNICAL FIELD

The present disclosure relates generally to touch sensor devices and, more particularly, to resolving multiple touches on a multiple touch sensor device.

BACKGROUND

One type of touch sensor device operates by way of capacitance sensing utilizing capacitance sensors. The capacitance detected by a capacitance sensor changes as a function of the proximity of a conductive object to the sensor. The conductive object can be, for example, a stylus or a user's finger. In a touch sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch sensor pad or touch sensor screen in the X and Y dimensions. A touch sensor strip, slider, or button operates on the same capacitance-sensing principle.

One type of touch sensor device is composed of a matrix of rows and columns. Within each row or column, there are multiple sensor elements, however, all sensor pads within each row or column are coupled together and operate as one long sensor element. The number of touches (e.g., the presence of a conductive object) a touchpad can detect is not the same as the resolution of the touchpad. For example, even though a touchpad may have the capability to detect two substantially simultaneous touches with an XY matrix, such touchpads cannot resolve the location of the two substantially simultaneous touches. When there are two simultaneous touches on a touchpad, there are two columns that detect an increase in capacitance. Likewise, there are two corresponding rows that also detect an increase in capacitance. As a result, there are four intersections where a column and row both detect an increase in capacitance. These intersections represent potential touch locations. The potential touch locations are evaluated to determine which locations are "actual touch" locations and which are invalid touches, also referred to as "ghost touch" locations or "phantom" locations. One way to resolve the location of a second touch is if the touches arrive sequentially in time. This allows the potential locations to be evaluated to determine which locations are "actual touch" locations and which are invalid touches. If both touches arrive or are detected substantially simultaneously, there is no way to resolve which of the two pairs of potential locations constitute "actual" touches, instead of invalid touches (e.g., "ghost" touches). Thus, such two-axis touchpads are configured to resolve only a location of a single touch. Similarly, current touch screens are designed to detect the presence and location of a single touch.

BRIEF DESCRIPTION OF THE DRAWINGS

Embodiments are illustrated by way of example and not intended to be limited by the figures of the accompanying drawings in which like references indicate similar elements and in which:

FIGS. 7A-7H illustrate a sensor window as it shifts through a number of sensor elements to determine whether a conductive object is present according to an embodiment.

DETAILED DESCRIPTION

In the following description, for purposes of explanation, numerous specific details are set forth in order to provide a thorough understanding of embodiments of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description. Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. It should be noted that although embodiments may be described in regards to a "finger" touch, the term "touch" as used herein refers to the presence (i.e., in contact or close enough proximity for detection) of a conductive object (such as a finger or conductive stylus).

A method of resolving multiple touches from data received from a multi-touch sensor device is described. In one embodiment, a slope detection method is used that evaluates the touch sensor element signals of a group of two or more sensor elements for a slope. The touch sensor element locations of the slopes may be stored and the number of touches may be calculated with sensor element signal data of some number of sensor elements. In one embodiment, a group of two or more sensor elements may be evaluated for a rising or falling slope, which is interpreted as the presence of a conductive object.

The slope in sensor element signal values corresponds to the difference in count values between a stored value for no sensor element activation and an acquired value with sensor element activation, for each of the sensor elements of a touch sensor array that are scanned. The counts are directly proportional to the sensed signal (e.g., capacitance) for a sensor element. Active elements within each slope are then used to determine multiple touches. The active elements are the sensors elements that are determined to have a difference count above a presence threshold value.

Figure 1A:
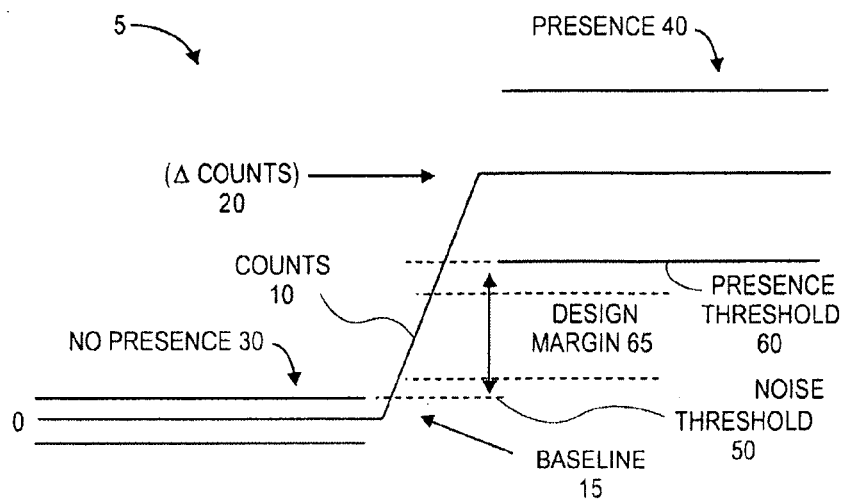
FIG. 1A illustrates a graph of a difference count of a single sensor element according to an embodiment.
Figure 2A:
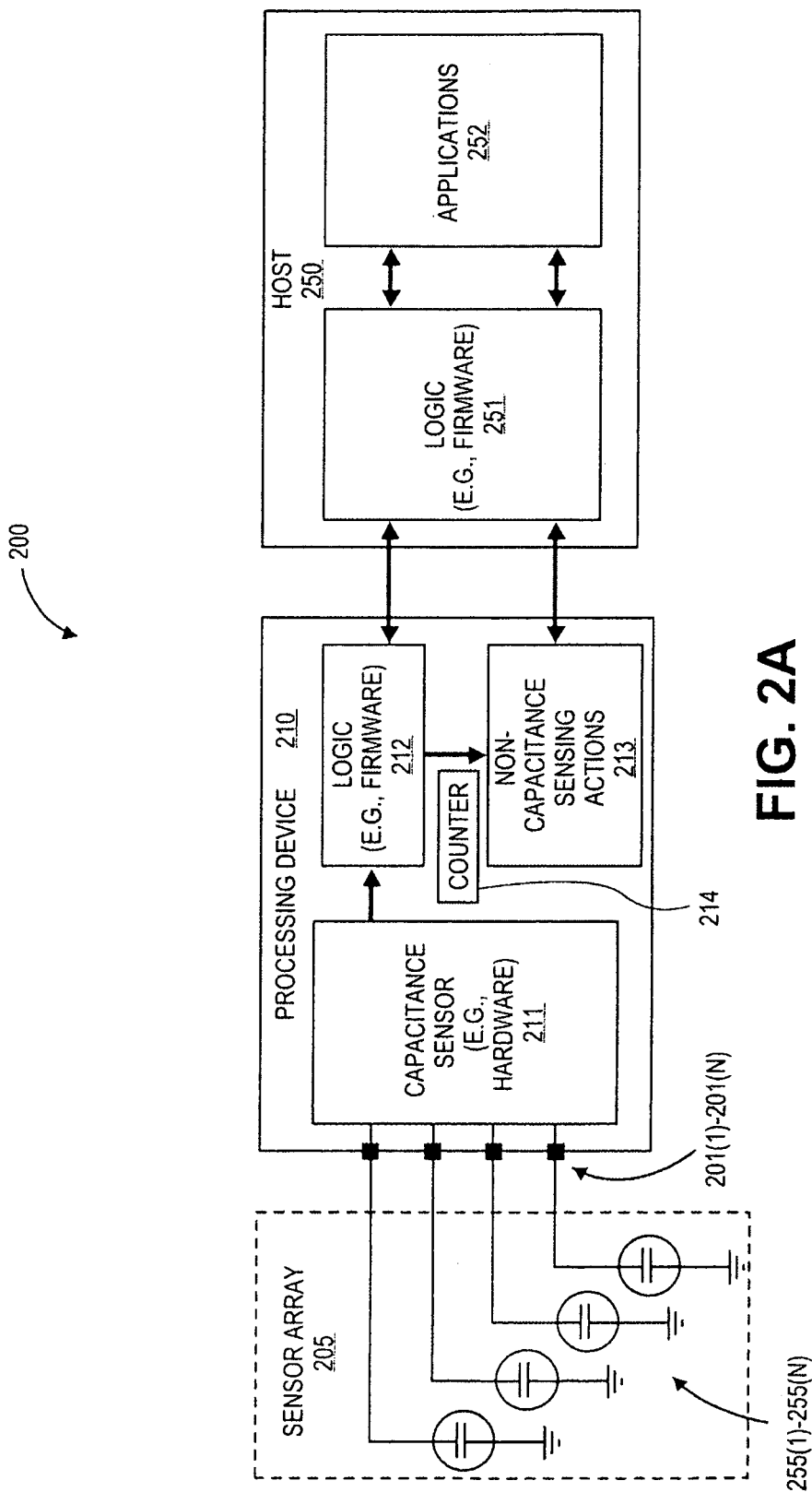
FIG. 2A illustrates a block diagram of one embodiment of an electronic device having a touch sensor device and a processing device that includes a capacitance sensor for measuring the capacitance on a sensor array and logic implementing embodiments.

FIG. 1A illustrates a graph 5 of a difference count of a single sensor element. At startup (or boot) of a touch sensor array, the sensor elements 255(1)-255(N) (N is a positive integer value that represents the number of sensor elements, where N is equal to four in the figures, but may be less or more than four) of a touch sensor array 205, as illustrated in FIG. 2A, are scanned and the count values for each sensor element with no activation are stored as a baseline 15. The presence of a finger or conductive object on a sensor element is determined by the difference in counts between a stored value for no sensor element activation and an acquired value with sensor element activation, referred to as a difference count (Δ Counts) 20.

Graph 5 includes the counts 10 as measured on a single sensor element for "no presence" 30 on the sensor element, and for "presence" 40 on the sensor element. "No presence" 30 is when the sensing device does not detect the presence of the conductive object, such as a finger. "No presence" 30 may be configured to be detected below a noise threshold 50. So long as the counts 10 are measured as being below noise threshold 50, the sensing device detects "no presence." "Presence" 40 is when the sensing device detects the presence of the conductive object (e.g., finger) on the sensor element. In one embodiment, presence 40 is detected when the counts 10 are greater than noise threshold 50. In another embodiment, presence 40 is detected when the counts 10 are greater than a presence threshold 60. The presence threshold may be used to include a design margin 65 in determining that a presence of a conductive object is detected on the sensing element.

Figure 1B:
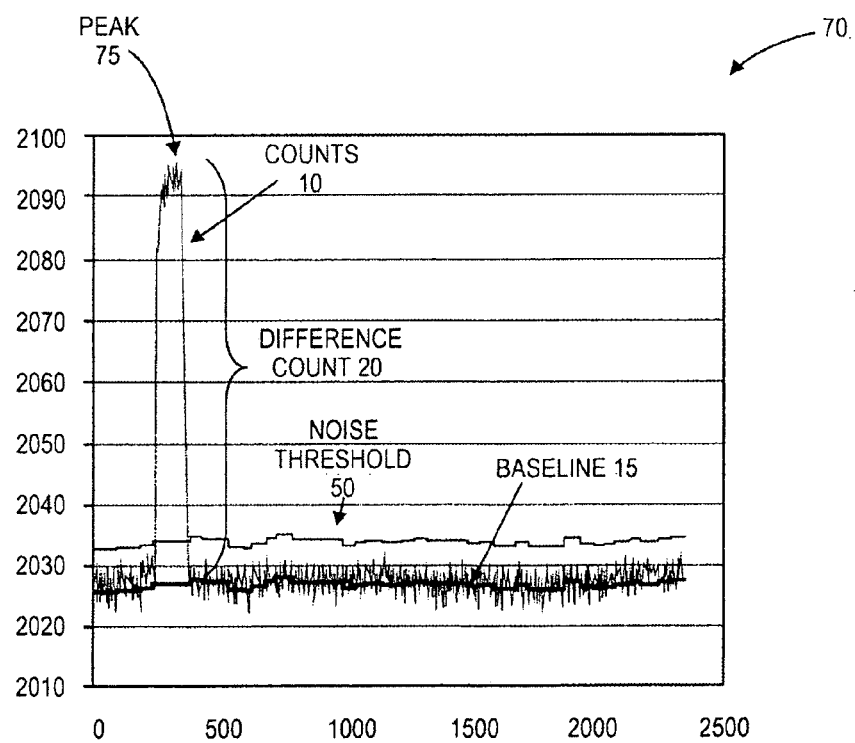
FIG. 1B illustrates a graph of capacitance measured on a single sensor element according to an embodiment.

FIG. 1B illustrates a graph of peak capacitance measured on a single sensor element. The graph 70 illustrates the measured capacitance as counts 10, as well as the baseline 15. A baseline 15, or reference, may be tracked so the processing device 210 of FIG. 2A knows when the user interaction is present (e.g., finger on sensor element) by comparing the counts 10 (representing the capacitance due to the presence of a conductive object, such as user's finger) with the baseline 15. The baseline counts 15 are the counts that normally occur on a sensor without the presence of a conductive object. The difference counts 20 are counts that exceed the baseline threshold 15. A noise threshold count 50 may be set so that the processing device 210 can discriminate between noise and when the user interaction is present (e.g., finger on sensor element). For example, without the presence of a finger on a sensor, the baseline 15 may be 2030 counts. When a finger is present, the counts 10 go up to, for example, to 2095 (and thus the difference count 20 is 65) which is above noise threshold 50 and results in the peak 75 being detected by the peak detection algorithm that is used. It should be noted that the values provided in FIG. 1B are only for illustrative purposes. In alternative embodiments, other thresholds such as a negative noise threshold and a presence threshold 60 may be used.

FIG. 2A illustrates a block diagram of one embodiment of an electronic device 200 including a processing device that includes a capacitance sensor for measuring the capacitance on a sensor array and logic implementing embodiments of the present invention discussed herein. The electronic device 200 includes the sensor array 205, processing device 210, and host 250. The sensor array 205 may be a single set of sensor elements that are disposed in at least one dimension of the touch sensor device. The sensor array 205 is coupled to pins 201(1)-201(N) of the processing device 210. Each sensor element is represented as a capacitor. Sensor array 205 includes sensor elements 255(1)-255(N), where N is a positive integer value that represents the number of sensor elements of the sensor array 205. Although only four sensor elements are illustrated in FIG. 2, the set of sensor elements may include more or less sensor elements than four. In one embodiment, the capacitance sensor 211 may include a selection circuit (not illustrated). The selection circuit is coupled to the sensor elements 255(1)-255(N) and the sensing circuitry of the capacitance sensor 211. The selection circuit may be used to select which of the multiple sensor elements to provide the charge current and to measure the capacitance of each sensor element.

The processing device 210 further includes a logic block 212 to implement embodiments of the method described above. The operations of logic block 212 may be implemented in firmware; alternatively, it may be implemented in hardware or software. Processing device 210 may also include hardware or firmware for performing non-capacitance sensing actions 213. Additionally, processing device 210 may include a counter 214 which is incremented each time a conductive object is determined to be present on sensor array 205. In one embodiment the counter is implemented using firmware, however, in alternative embodiments a hardware counter may be used. Alternatively, instead of performing the operations of the logic 212 in the processing device 210, the processing device 210 may send the raw data to a host processing device 250 for operation by logic 251. The operations of logic 251 may also be implemented in firmware, hardware, and/or software. Embodiments of the method operations described herein may be implemented in logic 212, logic 251, applications 252, or in other hardware, software, and/or firmware in the processing device 210.

Various known circuitry may be used to implement capacitance sensor 211 for detection of capacitive sensor activation. For example, such detection may be performed utilizing a capacitive switch relaxation oscillator (CSR). The CSR may be coupled to an array of sensor elements using a current-programmable relaxation oscillator, an analog multiplexer, digital counting functions, and high-level software routines as discussed above.

It should be noted that there are various known methods for measuring capacitance with a capacitance sensor. The present embodiments are not limited to using relaxation oscillators, but may include other methods known in the art, such as current versus voltage phase shift measurement, resistor-capacitor charge timing, capacitive bridge divider, charge transfer, sigma-delta modulators, charge-accumulation circuits, or the like. Additional details regarding these alternative embodiments are not included so as to not obscure the present embodiments, and because these alternative embodiments for measuring capacitance are known by those of ordinary skill in the art. A processing device having a capacitance sensor can be obtained from Cypress Semiconductor Corporation of San Jose, Calif. Alternatively, processing devices having capacitance sensors may be obtained from other companies.

It should be noted that the sensor array 205 may be utilized in any one of various types of devices such as a touchpad, touch screen, touch sensor buttons, etc. Furthermore, the sensor array 205 may have any one of various different configurations, for example, a multiple dimension matrix, a single dimension linear slider, a radial slider, etc.

Touch pads that detect multiple touches may use a counting technology which iterates through the sensors, examining the signals caused by the detected capacitance. When a non-zero data value following a zero (inactive sensor) is encountered, it marks that sensor as the start of a conductive object. The system continues iterating and increments the size of the conductive object until another inactive sensor is found, indicating the end of the conductive object. An inactive sensor may be present between conductive objects in order to detect two touches. However, if two fingers are placed close together on the slider, they may appear as one touch, since there are no inactive sensors between the fingers.

Figure 2B:
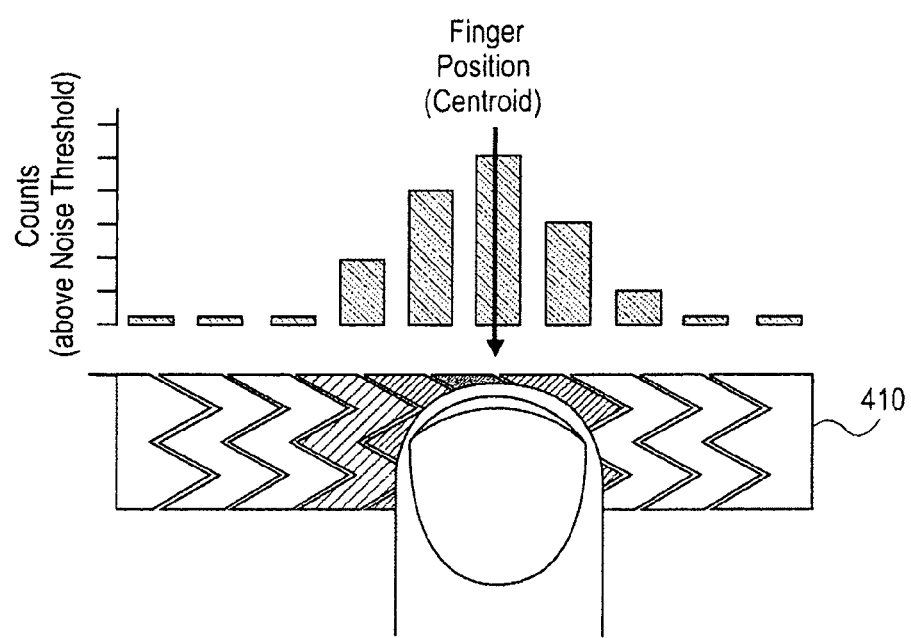
FIG. 2B illustrates a centroid algorithm for resolving the presence of a touch according to an embodiment.

FIG. 2B is a conceptual illustration of a centroid based finger position interpolation technique according to an embodiment. In order to calculate an interpolated position of a finger (on a touch sensor device such as a slider 410) using a centroid, the signal of a peak detected sensor element and those immediately adjacent may be used to compute a centroid:

$$\text{Centroid} = \frac{n_{i-1} \cdot (i-1) + n_i i + n_{i+1} \cdot (i+1)}{n_{i-1} + n_i i + n_{i+1}}$$

where n is a signal of a sensor element and i is the location of the strongest signal sensor element. In order to report the centroid to a specific resolution, for example a range of 0 to 100 (units relative to a desired resolution) for 12 sensor elements, the centroid value may be multiplied by a calculated or predetermined scalar. Alternatively, the interpolation and scaling operations may be combined into a single calculation and report this result directly in the desired scale. The above centroid algorithm may be used with each of the multiple peaks detected when two or more fingers are present on a touch sensor device as discussed below. In one embodiment, where the touch sensor device includes columns and rows of sensors arranged in an XY matrix, the process described above is repeated for each row and column to determine the position of a touch in the X and Y directions, respectively. In an embodiment where multiple touches are detected, the signal attributable to a second touch is set to zero while the centroid calculation for the first touch is performed. To determine the position of the second touch, the signal attributable to the first touch is set to zero during the calculation, which is performed as described above. Alternatively, other algorithms, including other centroid algorithms may be used to calculate the position of the touch.

Figure 2C:
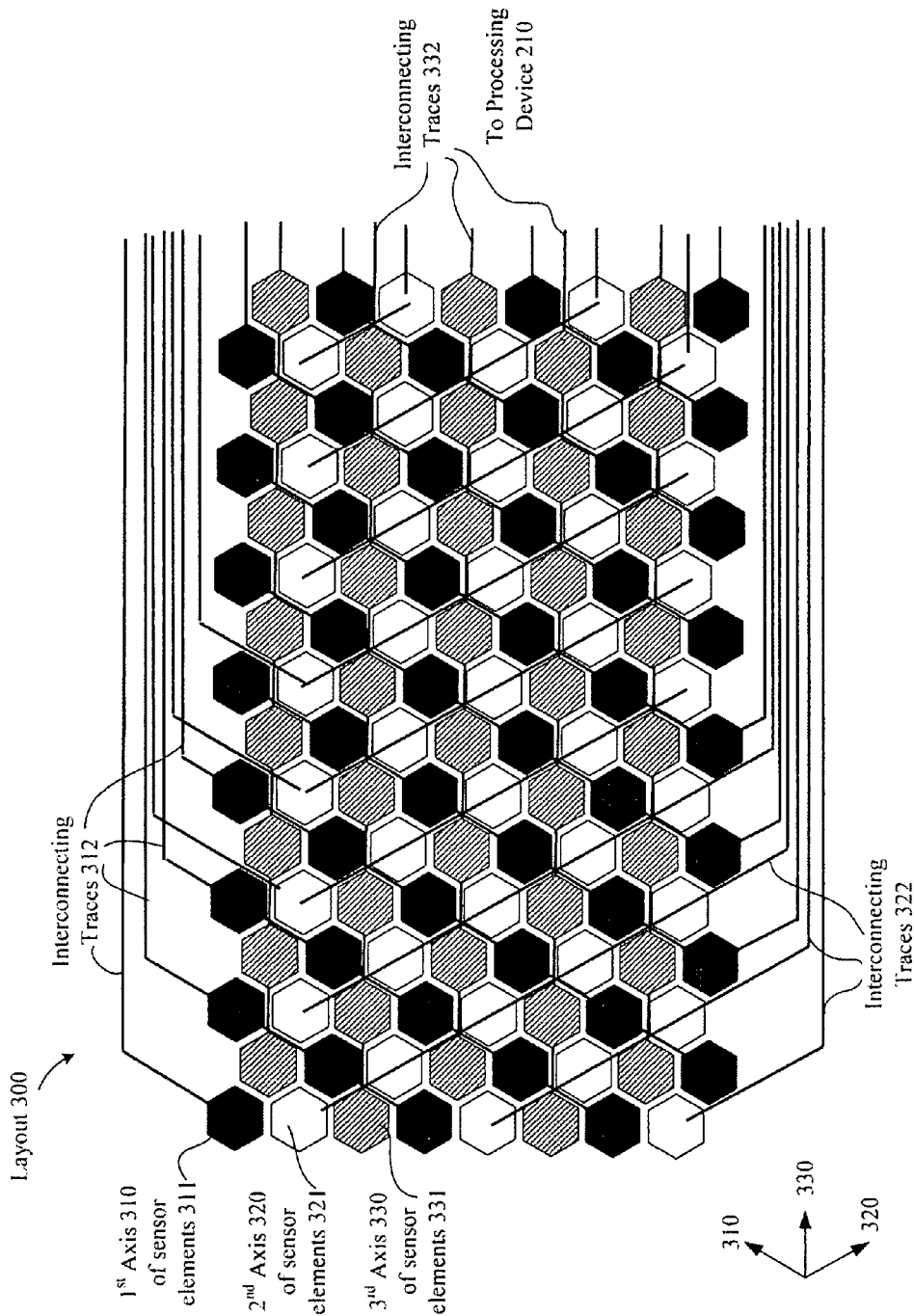
FIG. 2C illustrates one embodiment of a layout for hexagon-based tri-axial sensing.

FIG. 2C illustrates one embodiment of a layout 300 for hexagon-based tri-axial sensing in which the method described herein may be implemented. Layout 300 includes three independent sensing axes, namely first axis 310, second axis 320, and third axis 330. Each axis 310, 320, 330 includes multiple sensors 311, 321, 331, respectively. Sensor elements 311, 321, 331 are coupled to interconnecting traces 312, 322, 332, respectively, which are coupled to the processing device 210. In one embodiment, each of the three axes is scanned and the slope identification method is performed as described below. A method of centroid based finger position determination using a tri-axial sensing layout, such as layout 300, is described in United States Patent Application Publication No. 2008/0150906, assigned to Cypress Semiconductor Corporation.

Figure 2D:
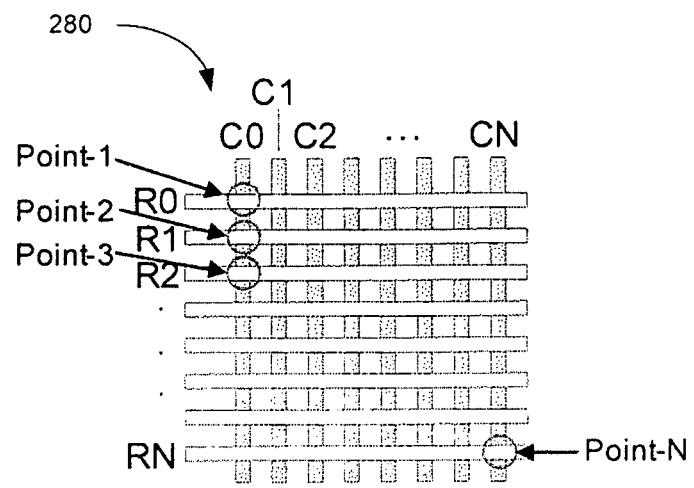
FIG. 2D illustrates multiple touch points that are to be resolved using mutual capacitance according to an embodiment.
Figure 2E:
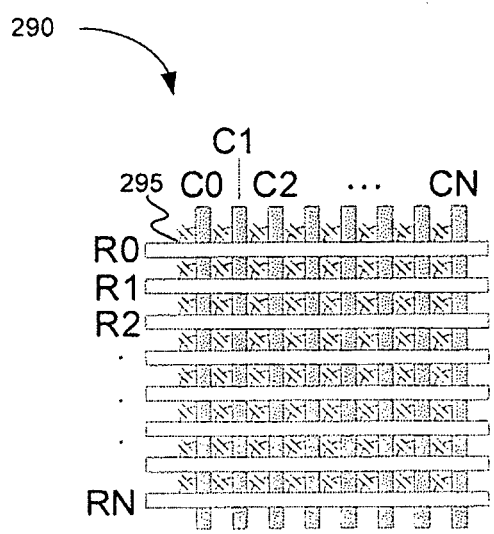
FIG. 2E illustrates the coupling capacitance between rows and columns according to an embodiment.

In another embodiment, the sensor array, such as sensor array 205, may be configured for mutual capacitance sensing. FIG. 2D illustrates multiple touch points that are to be resolved using mutual capacitance according to an embodiment and FIG. 2E illustrates the coupling capacitance between rows and columns according to an embodiment. When a conductive object, such as a finger, is placed at an intersection (Point-1-Point-N) of rows R0-RN and columns C0-CN in touchpad matrix 280, the row to column coupling capacitance is changed at that intersection. The coupling capacitance 295 is illustrated between the rows R0-RN and columns C0-CN in touchpad matrix 290. A capacitance sensor is used to measure the capacitance change when a conductive object is placed on or near the touchpad. The change in capacitance at each intersection is used to determine the presence and location of the conductive object according to the slope detection method, as described further below.

Figure 3A:
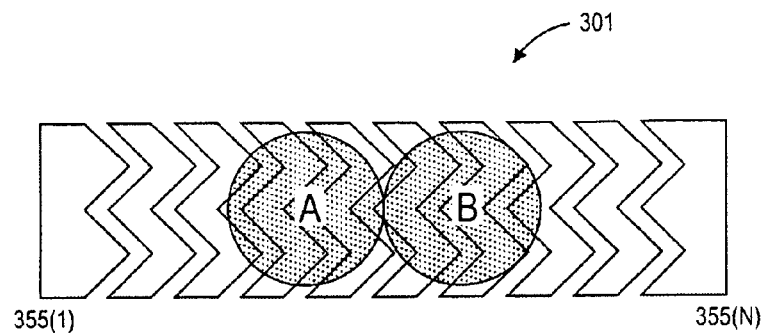
FIG. 3A illustrates the presence of two touches on a linear slider, according to an embodiment.

FIG. 3A illustrates the presence of two fingers on a linear slider, according to one embodiment of the present invention. In this example, two fingers (shown as circles A and B) are touching a sensor array which in the illustrated embodiment, is a linear slider. Each of the zagged strips represents a physical sensor (e.g., 355(1)-355(N)) in the touch sensor slider 301. In alternative embodiments, the sensors may have other shapes.

Figure 3B:
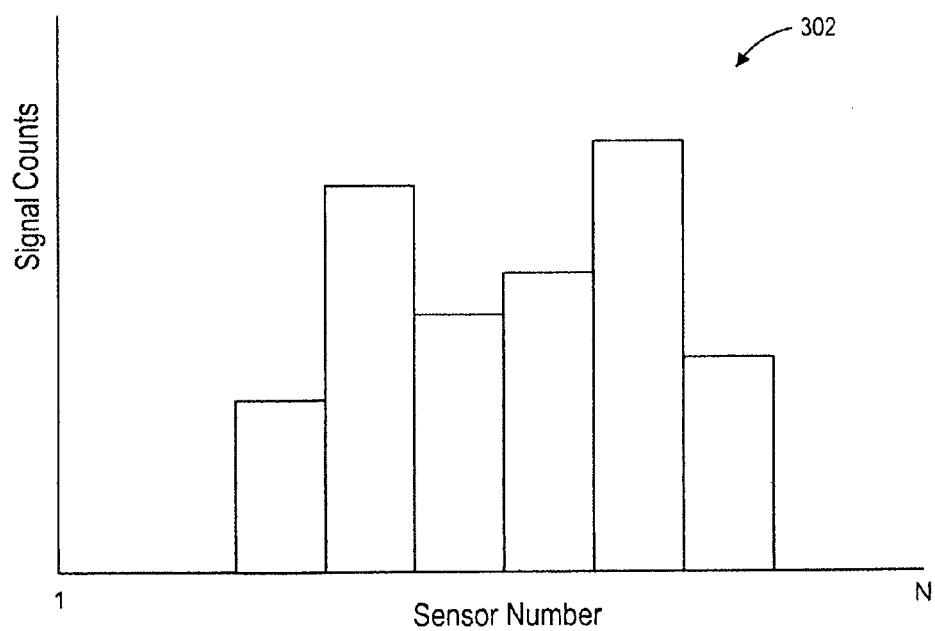
FIG. 3B illustrates is a chart illustrating the capacitance values sensed by the sensor elements of a linear slider according to an embodiment.

FIG. 3B is a chart illustrating the capacitance values sensed by sensor elements 355(1)-355(N) of the slider 301 of FIG. 3A. The capacitance values may represent the difference between the count value determined by each sensor and a baseline value when no conductive object is present. The horizontal axis of the chart 302 corresponds to the sensor element number, e.g., sensor 1 to sensor N, of the slider 301. The height of the columns on the vertical axis represents the measured difference counts for each of the sensor elements with the presence of fingers A and B on the slider as illustrated in FIG. 3A.

Figure 4:
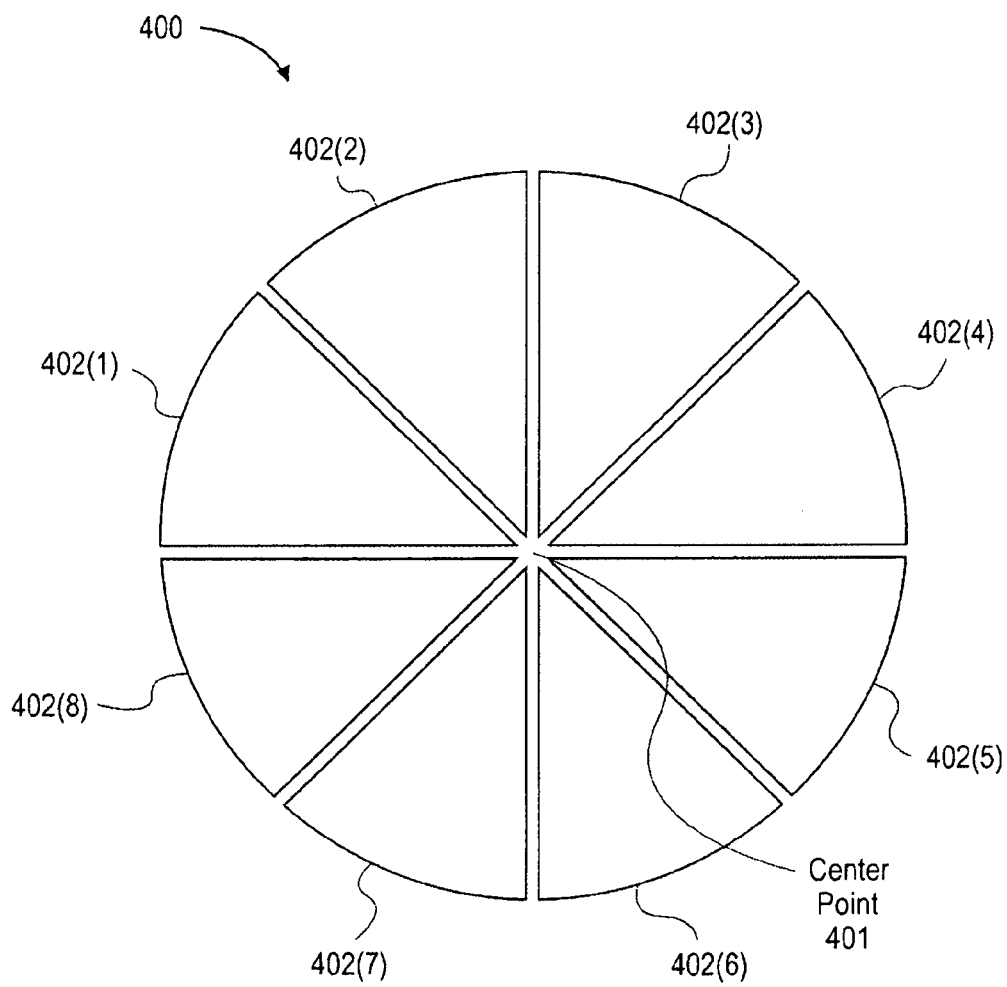
FIG. 4 illustrates a circular slider according an embodiment.

In alternative embodiments, the method discussed herein may also be utilized with a circular, or radial, slider. Circular sliders are also known as closed-cycle sliders because the first sensor element of a group of sensor elements is disposed to be adjacent to the last sensor element of the group, which in effect closes the group of sensor elements into a circle. In one embodiment, the sensor elements of the linear slider of FIG. 3A may be wrapped around to join each other forming a circular slider. In another embodiment, a circular slider configuration of sensor elements as illustrated in FIG. 4 may be used. Circular slider 400 includes n sensor elements. Although the illustrated circular slider includes eight sensor elements 402(1)-402(8), disposed non-linearly in a substantially circular shape, other numbers of sensor elements may be used. In one embodiment, the sensor elements 402(1)-402(8) have a pie-shape with the smaller side of the pie-shape towards the center point 401. In other words, each sensor element has a curved edge, which represents the outer edge of the circular shape of the sensing device 400, and two substantially straight edges, which represent the boundary to the adjacent sensor elements. The width of the pie-shaped sensor element may gradually decrease from the curved edge to the center point 401. In alternative embodiments, the circular slider may also include a center sensor element and may have other configurations.

Figure 5:
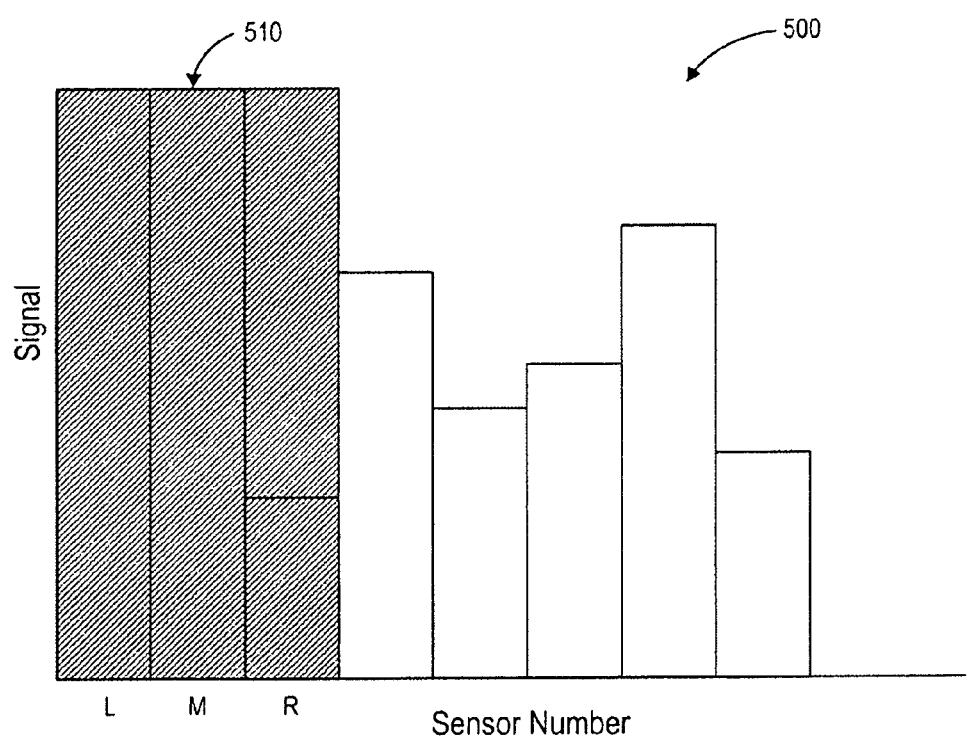
FIG. 5 illustrates a sensor window that examines the count values for a certain number of sensor elements to determine whether a conductive object is present according to an embodiment.

FIG. 5 illustrates a sensor window that examines the count values for a certain number of sensor elements to determine whether a conductive object is present. The chart 500 illustrates the capacitance values sensed by sensor elements (e.g., 355(1)-355(N)) of a slider (e.g., slider 310 of FIG. 3A). In one embodiment, the sensor window 510 examines three of the sensor elements at a time, however, in alternative embodiments, the sensor window examines two or more sensor elements. In this embodiment, the sensor window examines three sensors (labeled left, middle and right, for ease of explanation). The count values for the sensor elements currently being examined in sensor window 510 are read and processed according to an algorithm by processing device 210 to determine if a conductive object is present. Each time a conductive object is determined to be present, a counter is incremented so that the system can determine how many conductive objects (e.g., fingers) are present on the slider at a given time. Sensor window 510 logically represents a set of sensor elements that are currently being examined. Shifting sensor window 510 includes changing the set of elements that make up the set in the sensor window.

Figure 6:
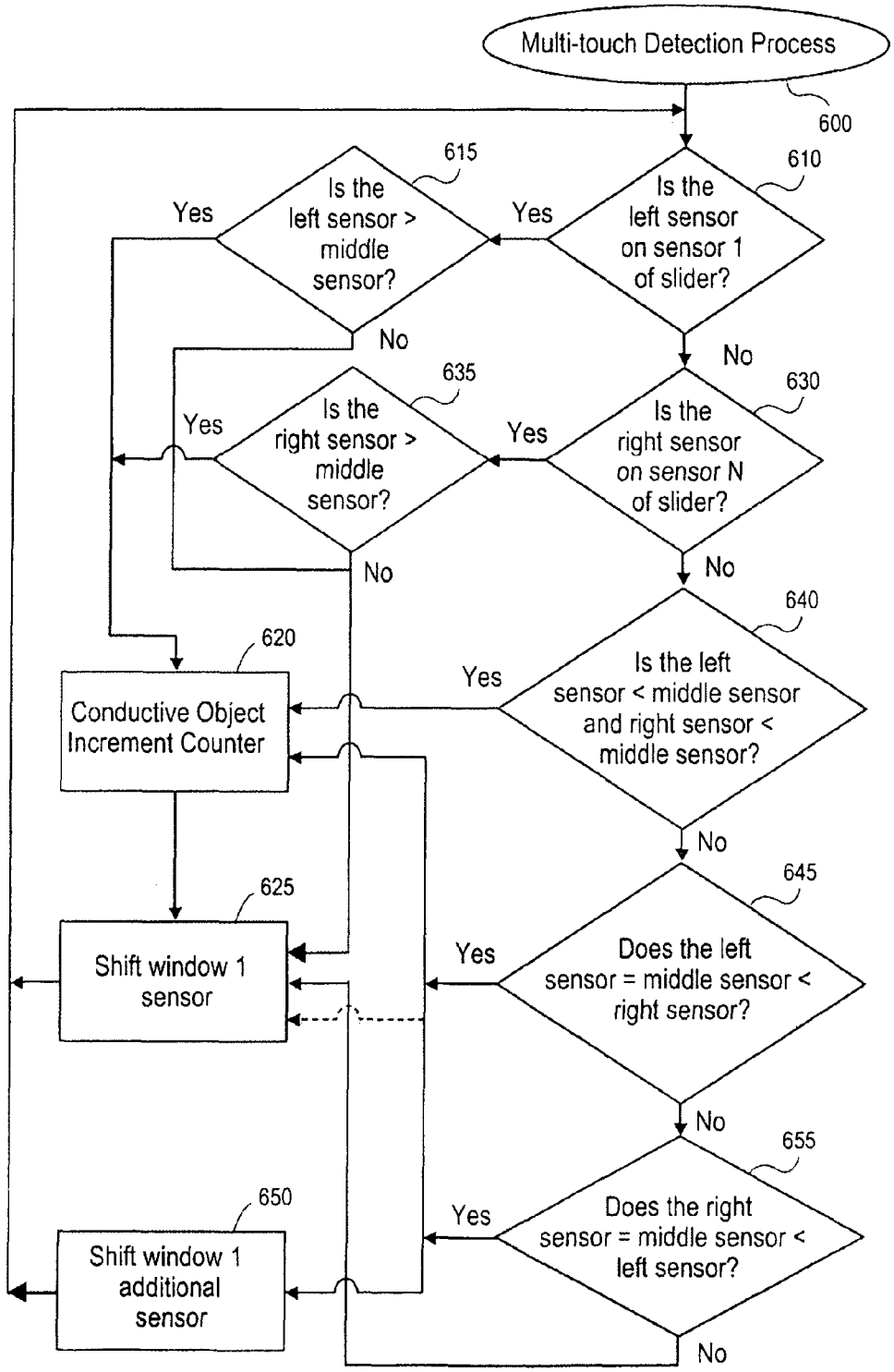
FIG. 6 is a flow diagram illustrating an algorithm used to determine whether a conductive object is present on a touch sensor slider according to an embodiment.

FIG. 6 is a flow diagram illustrating an algorithm used to determine if a conductive object is present on the touch sensor slider according to one embodiment. The process 600 may be performed by processing logic that comprises hardware (e.g., circuitry, dedicated logic, programmable logic, microcode, etc.), software (e.g., instructions run on a processing device to perform hardware simulation), or a combination thereof. FIGS. 7A-7H illustrate a sensor window as it shifts through a number of sensor elements to determine whether a conductive object is present according to one embodiment. The charts in FIGS. 7A-7H illustrate the capacitance values sensed by sensor elements (e.g., 355(1)-355(N)) of a slider (e.g., slider 310 of FIG. 3A or circular slider 400 of FIG. 4). In this embodiment the slider has ten sensor elements, meaning that there are eight possible locations for the sensor window. In this embodiment, in each of FIGS. 7A-7H, the sensor window (including three sensors) is shifted one sensor to the right along the slider. In alternative embodiments, the sensor window may have two or more sensors and may be shifted along the slider in another direction.

Referring to FIG. 6, in one embodiment, process 600 is performed by processing device 210 of FIG. 2A. In this embodiment, at block 610, process 600 determines if the left sensor of sensor window 510 is currently examining the first (corner) sensor of the slider. In a linear slider, the first corner sensor may be a sensor that has only one adjacent sensor. This situation is illustrated in FIG. 7A. Sensor window 510 currently includes sensors 1, 2 and 3 of the linear slider. If the condition at block 610 is met, process 600 proceeds to block 615. At block 615, process 600 determines if the count value of the left sensor of sensor window 510 is greater than the count value of the middle sensor. If YES, it is determined that a conductive object is present at block 620. FIG. 7A illustrates the case where the left sensor (sensor 1) has a count value greater than the middle sensor (sensor 2). In this case, the conductive object (e.g., a finger) may be partially off the left side of the touch sensor slider. A counter, such as counter 214, is incremented at block 620 and process 600 continues to block 625. At block 625, process 600 shifts sensor window 510 one sensor to the right (as shown in FIG. 7B). Process 600 then returns to block 610. If at block 615, the condition is not met, process 600 proceeds directly to block 625.

If at block 610, the condition is not met, process 600 proceeds to block 630. At block 630, process 600 determines if the right sensor of sensor window 510 is currently examining the last (corner) sensor (e.g., sensor N) of the slider. This situation is illustrated in FIG. 7H. If YES, process 600 proceeds to block 635. At block 635, process 600 determines if the count value of the right sensor of sensor window 510 is greater than the count value of the middle sensor. If YES, it is determined that a conductive object is present at block 620. In this case, the conductive object may be partially off the right side of the touch sensor slider. A counter, such as counter 214, is incremented at block 620 and process 600 continues to block 625. If at block 635, the condition is not met, process 600 proceeds directly to block 625. In FIG. 7H, the right sensor (sensor 10) is not greater than the middle sensor (sensor 9), so the condition of block 635 is not met.

If at block 630, the condition is not met, process 600 proceeds to block 640. At block 640, process 600 determines if the count value of the left sensor of sensor window 510 is less than the count value of the middle sensor and if the count value of the right sensor is less than the count value of the middle sensor. If YES, it is determined that a conductive object is present at block 620. FIG. 7C illustrates the case where the middle sensor (sensor 4) has a count value that is greater than both the left sensor (sensor 3) and the right sensor (sensor 5). A counter such as counter 214 is incremented at block 620 and process 600 continues to block 625.

If at block 640, the condition is not met, process 600 proceeds to block 645. At block 645, process 600 determines if the count value of the left sensor of sensor window 510 equals the count value of the middle sensor (where the left and middle sensors have a count value greater than the baseline value) and if the count value of the right sensor is greater than the count value of the middle sensor and left sensor. If YES, it is determined that a conductive object is present at block 620. FIG. 7E illustrates the case where the left and middle sensors (sensors 5 and 6) are equal and the right sensor (sensor 7) is greater than both the left and middle sensors. A counter, such as counter 214, is incremented at block 620 and process 600 continues to block 625. In this case, the equal count values on two sensors preceding a peak may indicate that two separate conductive objects are present on the touch sensor slider. One conductive object generally cannot create equal count values on two adjacent sensors and a higher count value on the third. Thus, a conductive object is detected if the condition is met. Because it is likely that another conductive object will be detected if the sensor window is shifted over one sensor (even though the peak is attributable to the same conductive object), the sensor window is shifted over another sensor at block 650, for a total of two sensors, so that the sensor window includes a group of adjacent sensor elements that shares only one sensor element with the previous group. Thus, the sensor window is shifted from its position in FIG. 7E, skipping the position in FIG. 7F, to the position in FIG. 7G. This prevents a second presence detection from the same conductive object. Process 600 then returns to block 610. In an alternative embodiment, if the condition is met at block 645, process 600 proceeds directly to block 625 and shifts the sensor window without counting the presence of a conductive object.

If at block 645, the condition is not met (i.e., NO), process 600 proceeds to block 655. At block 655, process 600 determines if the count value of the right sensor of sensor window 510 equals the count value of the middle sensor (where the middle and right sensors have a count value greater than the baseline value) and if the count value of the left sensor is greater than the count value of the middle sensor and right sensor. If, YES, it is determined that a conductive object is present at block 620. FIG. 7D illustrates the case where the middle and rights sensors (sensors 5 and 6) are equal and the left sensor (sensor 4) is greater than both the right and middle. A counter, such as counter 214, is incremented at block 620 and process 600 continues to block 625. In this case, the equal count values on two sensors following a peak may indicate that two separate conductive objects are present on the touch sensor slider. In order to prevent a second presence detection from the same conductive object, the sensor window is shifted over one additional sensor at block 650, so that the sensor window includes a group of adjacent sensor elements that shares only one sensor element with the previous group. Process 600 then returns to block 610. In an alternative embodiment, if the condition is met at block 655, process 600 proceeds directly to block 625 and shifts the sensor window without counting the presence of a conductive object.

In another embodiment, the number of conductive objects present on a slider may be determined by counting a number of rising or falling slopes of sensor element count values. A rising or falling slope occurs when one sensor element has a count value greater than an adjacent sensor element. In one embodiment, the sensor elements are examined using a sliding sensor window, similar to sensor window 510, including two or more sensors. The sensor window may be shifted along the slider in either direction. Additional embodiments may include determining the presence of a conductive object by detecting a combination of sensor count peaks and rising slopes.

Figure 8:
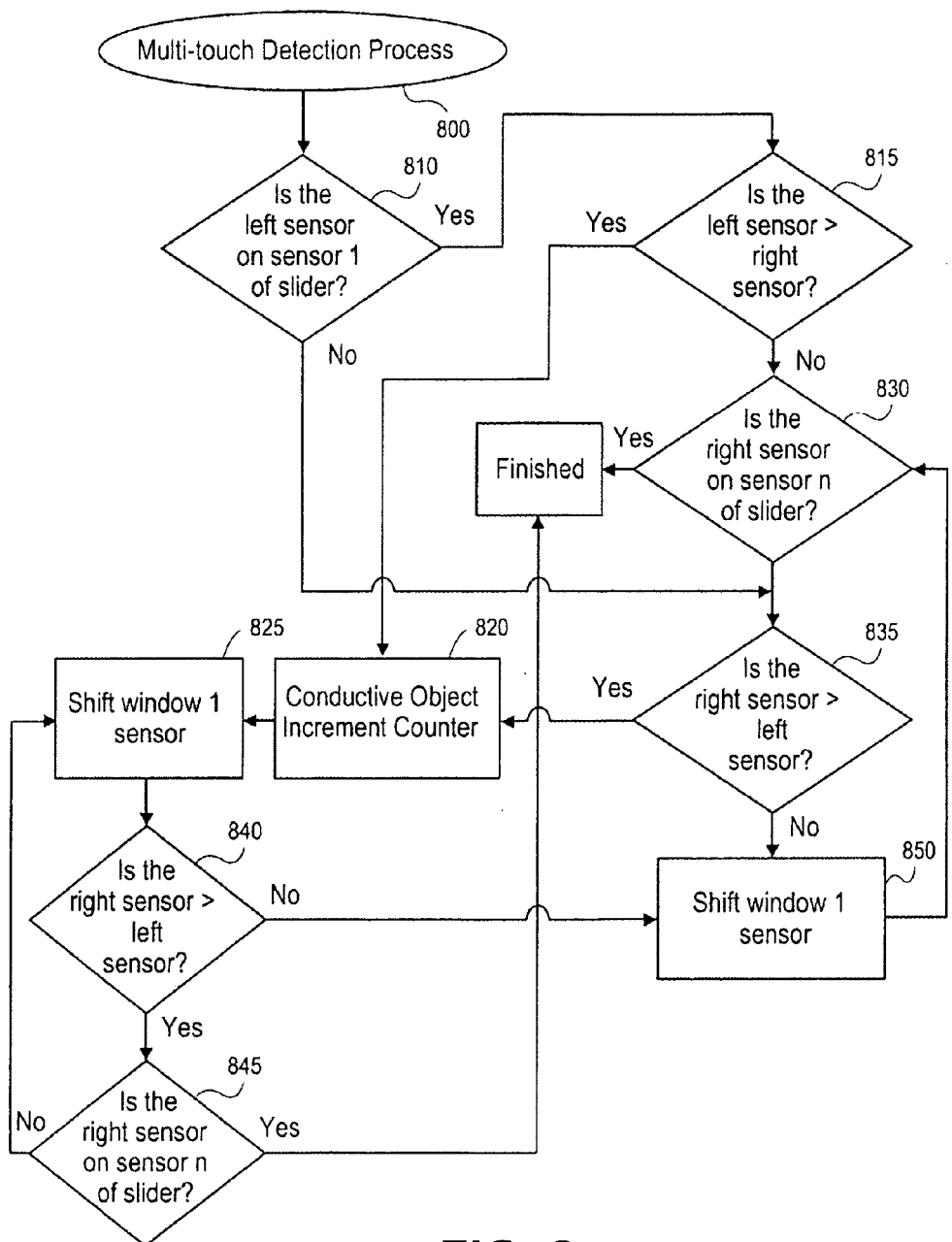
FIG. 8 is a flow diagram illustrating an algorithm used to determine whether a conductive object is present on a touch sensor slider according to an embodiment.

FIG. 8 is a flow diagram illustrating an algorithm used to determine if a conductive object is present on the touch sensor slider according to one embodiment. The process 800 may be performed by processing logic that comprises hardware (e.g., circuitry, dedicated logic, programmable logic, microcode, etc.), software (e.g., instructions run on a processing device to perform hardware simulation), or a combination thereof. FIGS. 9A-9F illustrate a sensor window as it shifts through a number of sensor elements to determine whether a conductive object is present according an embodiment. The charts in FIGS. 9A-9F illustrates the capacitance values sensed by sensor elements (e.g., 355(1)-355(N)) of a slider (e.g., slider 310 of FIG. 3A) or other touch sensor device. In this embodiment a sensor window covering two sensors is shifted from left to right across the slider and detects the presence of a rising slope attributable to the presence of a conductive object.

Figure 9A:
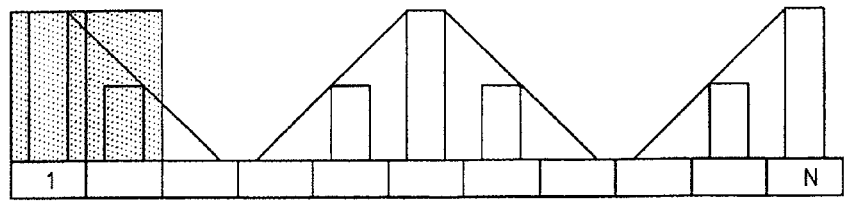
FIGS. 9A-9F illustrate a sensor window as it shifts through a number of sensor elements to determine whether a conductive object is present according to an embodiment.
Figure 9B:
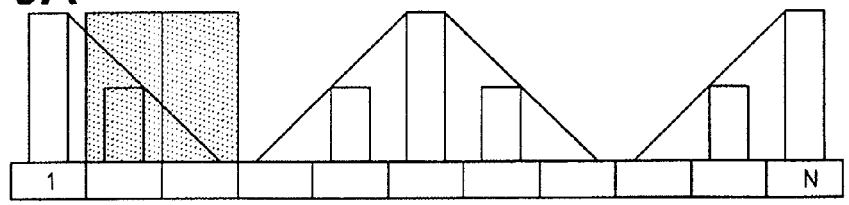
Figure 9C:
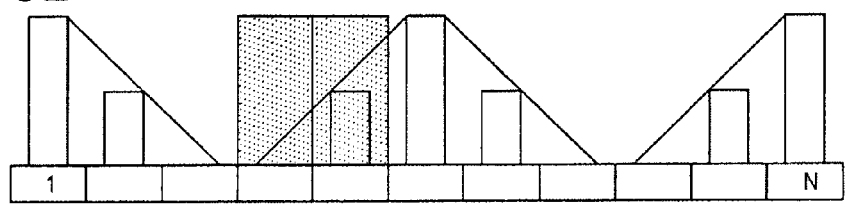

Referring to FIG. 8, in one embodiment, process 800 is performed by processing device 210 of FIG. 2A. In one embodiment, at block 810, process 800 determines if the left sensor of the sensor window is currently examining the first (corner) sensor of the slider. In a linear slider, the first corner sensor may be a sensor that has only one adjacent sensor. For example, in FIG. 9A the sensor window is examining sensors 1 and 2 of the slider, where sensor 1 is a corner sensor. If the condition at block 810 is met, process 800 proceeds to block 815. At block 815, process 800 determines if the count value of the left sensor of the sensor window is greater than the count value of the right sensor. If YES, it is determined that a conductive object is present at block 820. In this case, the conductive object (e.g., a finger) may be partially off the left side of the touch sensor slider. FIG. 9A illustrates a case where the count value of the left sensor is greater than the count value of the right sensor of the sensor window. A counter, such as counter 214, is incremented at block 820 and process 800 continues to block 825. At block 825, process 800 shifts the sensor window one sensor to the right (as shown in FIG. 9B). If at block 815, the condition is not met, process 800 proceeds to block 830.

Figure 9D:
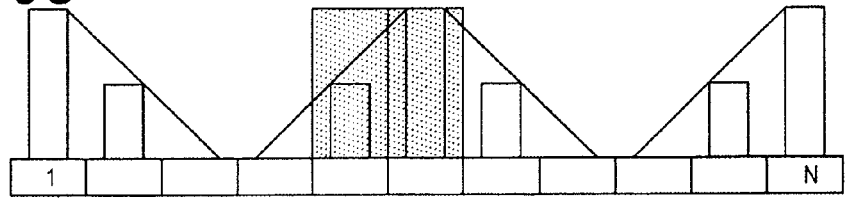
Figure 9E:
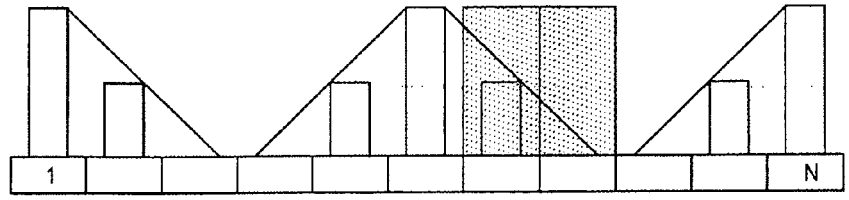
Figure 9F:
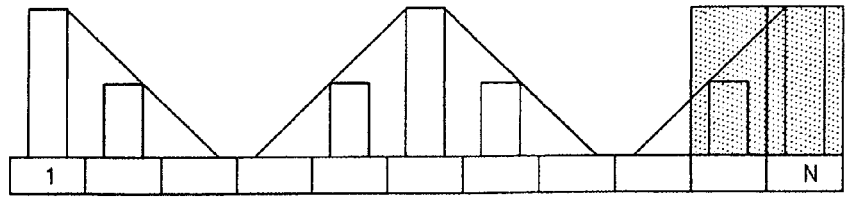

At block 830, process 800 determines if the right sensor of the sensor window is currently examining the last (corner) sensor (e.g., sensor N) of the slider. This case is illustrated in FIG. 9F. If so, process 800 finishes. If at block 830, the condition is not met, process 800 proceeds to block 835. Similarly, if at block 810, the condition is not met, process 800 also proceeds to block 835.

At block 835, process 800 determines if the right sensor of the sensor slider has a count value that is greater than the left sensor of the sensor slider. If YES, it is determined that a conductive object is present at block 820. For example, in FIG. 9C, the right sensor of the slider (sensor 5) has a count value that is greater than the left sensor (sensor 4). A counter such as counter 214 is incremented at block 820 and process 800 continues to block 825, where process 800 shifts the sensor window one sensor to the right (as shown in FIG. 9D).

At block 840, process 800 determines if the count value of the right sensor of the sensor window is greater than the count value of the left sensor. If, YES, process 800 proceeds to block 845. At block 845, process 800 determines if the right sensor of the sensor window is currently examining the last (corner) sensor (e.g., sensor N) of the slider. If YES, process 800 finishes. If at block 845, the condition is not met, process 800 returns to block 825. In FIG. 9D, the condition of block 840 is met (sensor 6 is greater than sensor 5), but the condition of block 845 is not, so the sensor window is shifted one sensor to the right without incrementing the counter (as shown in FIG. 9E).

If at block 840, the condition is not met, process 800 proceeds to block 850. At block 850, process 800 shifts the sensor window one sensor to the right. Process 800 then returns to block 830.

Multi-touch detection processes 600 and 800 allow a processing device to determine a number of conductive objects present on a touch sensor device. In certain embodiments, a processing device may determine the location of those touches according the method described above with respect to FIG. 2B. In alternative embodiments, the processes 600 and 800 may be implemented using touch sensor devices such as a linear slider, a circular slider, a touch sensor pad including an array of sensors, or other similar device. The processes may be implemented using a circular slider, such as slider 400 of FIG. 4 in a manner similar to that described above. A circular slider is oriented so that each sensor element is adjacent to at least two other sensor elements. Consequently, there are no end (or corner) sensor elements. A touch sensor array may function similarly to a touch sensor slider in that the array may include several rows of sensor elements. In one embodiment a processing device may treat each row (or column) of sensor elements as if it were a linear slider, as described above.

In other embodiments, the multi-touch detection processes described above may be implemented in a liquid crystal display (LCD) device. An LCD device may include an array of pixels that are used to display an image. The pixels may also be used to detect the presence of a conductive object (e.g., a finger) on or near the surface of the LCD device. Electrodes of the pixels are driven with an excitation signal to bring the electrodes to a known baseline signal value. The presence of a conductive object near an electrode alters that signal value, such that when each pixel is scanned, processing circuitry can determine the presence and location of the conductive object based on the slopes that occur in the signal values. Detailed operation of such an LCD sensing device is described in Patent Cooperation Treaty International Application Publication No. WO 2005/036510 A1 owned by Integritouch Development AB.

Figure 10A:
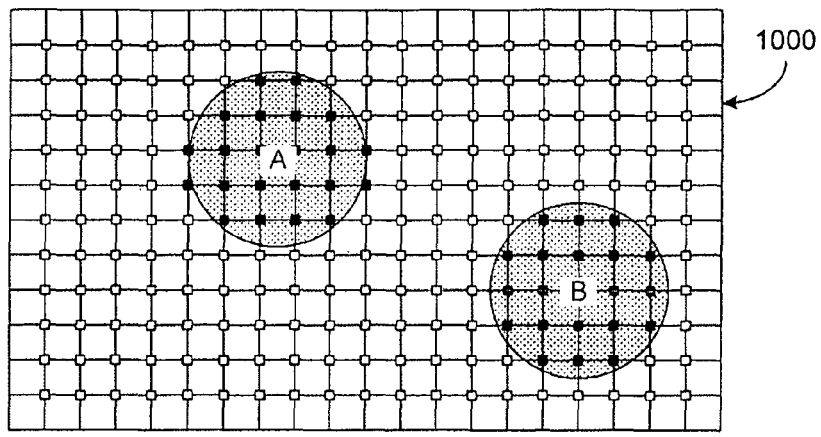
FIGS. 10A-10C illustrate a pixel matrix of an LCD sensing device, according to one embodiment.
Figure 10B:
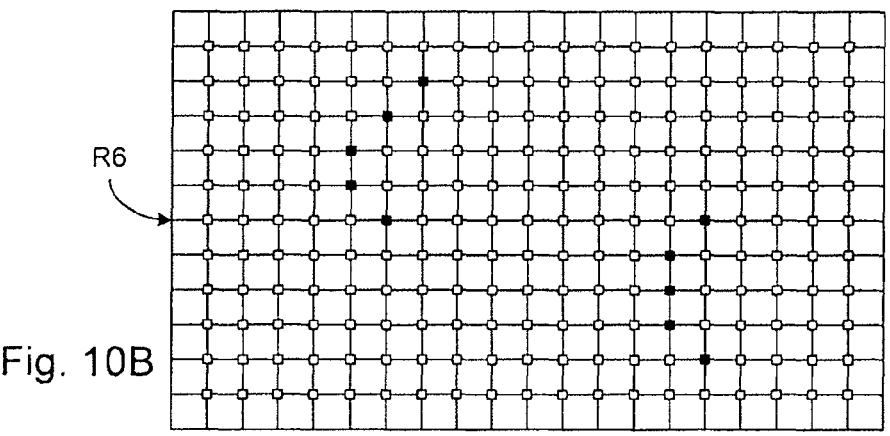
Figure 10C:
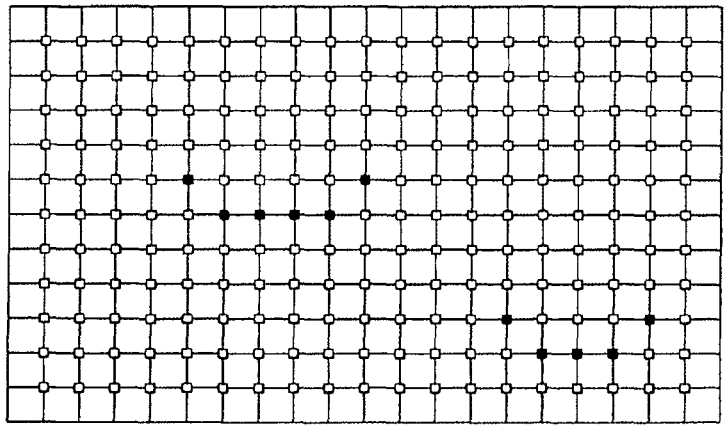

FIG. 10A illustrates a pixel matrix of an LCD sensing device, according to one embodiment. In this example, two fingers (shown as circles A and B) are touching a sensor array of LCD device 1000. The sensors that have a variation in signal values are considered active (indicated in the figure by the black pixels). As each sensor in the array is scanned (e.g., from left to right, as shown in FIG. 10B or from bottom to top, as shown in FIG. 10C), a positive slope exists where the sensors go from inactive to active. The first rising slope in each row or column indicates the edge of a conductive object. These slopes are illustrated in the crescent-shaped activation signatures shown in FIGS. 10B and 10C. In one embodiment, certain rows or columns (e.g., R6 of FIG. 10B) may have more than one rising slope. For example, in a row of sensors, there may be a first positive slope followed by a series of sensors with the same or a negative slope and then a second positive slope may occur. The occurrence of the second rising slope is indicative of the presence of a second conductive object (e.g., a second finger). The conductive objects may be sensed according to a multi-touch detection process, such as process 800 described above.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising:
scanning a touch sensor array to generate sensor element signals corresponding to each of a plurality of sensor elements of the touch sensor array;
identifying a sensor window including a first signal value of a first sensor element, of the plurality of sensor elements, and a second signal value of a second sensor element adjacent to the first sensor element;
detecting a slope by determining whether the second signal value is greater than the first signal value;
shifting the sensor window according to the detected slope, said shifting causing the sensor window to include a third signal value of a third sensor element of the plurality of sensor elements, wherein the third sensor element is different from the first sensor element and different from the second sensor element; and
locating the presence of the conductive object at the touch sensor array by locating a change in slope.

2. The method of claim 1, further comprising:
when the first sensor element comprises a corner sensor element and the first signal value is greater than the second signal value, determining that the conductive object is present.

3. The method of claim 1, further comprising:
comparing the third signal value to a fourth signal value of a fourth sensor element adjacent to the third sensor element;
detecting a slope by determining whether the fourth signal value is greater than the third signal value; and
when the fourth signal value is greater than the third signal value, determining that a second conductive object is present.

4. The method of claim 3, further comprising:
determining a location of the first conductive object and of the second conductive object relative to the touch sensor array.

5. An apparatus, comprising:
a touch sensor array having a plurality of sensor elements; and
a processing device operatively coupled to the touch sensor array and configured to:
scan a touch sensor array to generate sensor element signals corresponding to each of a plurality of sensor elements of the touch sensor array;
identify a sensor window including a first signal value of a first sensor element, of the plurality of sensor elements, and a second signal value of a second sensor element adjacent to the first sensor element;
detect a slope by determining whether the second signal value is greater than the first signal value;
shift the sensor window according to the detected slope, said shifting causing the sensor window to include a third signal value of a third sensor element of the plurality of sensor elements, wherein the third sensor element is different from the first sensor element and different from the second sensor element; and
locating a presence of a conductive object at the touch sensor array by locating a change in slope.

6. The apparatus of claim 5, wherein the processing device is further configured to:
when the first sensor element comprises a corner sensor element and the first signal value is greater than the second signal value, determine that the conductive object is present.

7. The apparatus of claim 5, wherein the processing device is further configured to:
compare the third signal value to a fourth signal value of a fourth sensor element adjacent to the third sensor element;
detect a slope by determining whether the fourth signal value is greater than the third signal value; and
when the fourth signal value is greater than the third signal value, determine that a second conductive object is present.

8. The apparatus of claim 5, wherein the touch sensor array comprises a one-dimensional linear slider.

9. The apparatus of claim 5, wherein the touch sensor array comprises a radial slider.

10. The apparatus of claim 5, wherein the touch sensor array comprises a two-dimensional touch-sensor pad.

11. The apparatus of claim 10, wherein the touch-sensor pad comprises a hexagon-based tri-axial sensor layout.

12. The apparatus of claim 11, wherein the touch sensor array comprises a liquid crystal display (LCD) sensing device.

13. The apparatus of claim 10, wherein the touch sensor array is configured for self-capacitance sensing.

14. The apparatus of claim 10, wherein the touch sensor array is configured for mutual-capacitance sensing.

15. A method comprising:
determining a slope based on compared signal values of sensor elements within a sensor window including a first sensor element, of a plurality of sensor elements in a touch sensor array, and a second sensor element in the touch sensor array adjacent to the first sensor element;
shifting the sensor window according to determined slope, said shifting causing the sensor window to include a third sensor element of the plurality of sensor elements, wherein the third sensor element is different from the first sensor element and different from the second sensor element; and locating the presence of the conductive object at the touch sensor array by locating a change in slope.

16. The method of claim 15, wherein determining the presence of the conductive object comprises:

detecting the slope by determining whether the second signal value is greater than the first signal value.

17. The method of claim 16, wherein detecting the slope comprises:

comparing the first signal value to the second signal value.

18. The method of claim 16, wherein determining the presence of the conductive object comprises:

when the first sensor element comprises a corner sensor element and the first signal value is greater than the second signal value, determining that the conductive object is present.

19. The method of claim 18, further comprising:

comparing a third sensor value of the third sensor element to a fourth signal value of a fourth sensor element adjacent to the third sensor element; and detecting a slope by determining whether the fourth signal value is greater than the third signal value, wherein when the fourth signal value is greater than the third signal value, a second conductive object is present.

* * * * *